United States Patent
So et al.

(10) Patent No.: US 10,108,392 B2
(45) Date of Patent: Oct. 23, 2018

(54) USER TERMINAL APPARATUS, DISPLAY APPARATUS CONNECTED TO USER TERMINAL APPARATUS, SERVER, CONNECTED SYSTEM, CONTROLLER, AND CONTROLLING METHOD THEREOF

(71) Applicant: SAMSUNG ELECTRONICS CO., LTD., Suwon-si (KR)

(72) Inventors: Yong-jin So, Seongnam-si (KR); Jung-geun Kim, Suwon-si (KR); Ji-hyae Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 346 days.

(21) Appl. No.: 14/881,228

(22) Filed: Oct. 13, 2015

(65) Prior Publication Data

US 2016/0124703 A1    May 5, 2016

(30) Foreign Application Priority Data

Nov. 4, 2014    (KR) ........................ 10-2014-0152141

(51) Int. Cl.

| | |
|---|---|
| *G06F 3/16* | (2006.01) |
| *G06F 3/0481* | (2013.01) |
| *H04B 1/40* | (2015.01) |
| *H04W 84/12* | (2009.01) |
| *H04M 1/725* | (2006.01) |

(52) U.S. Cl.
CPC .......... *G06F 3/165* (2013.01); *G06F 3/04817* (2013.01); *H04B 1/40* (2013.01); *H04M 1/7253* (2013.01); *H04M 1/72558* (2013.01); *H04W 84/12* (2013.01)

(58) Field of Classification Search
CPC ................................ G06F 3/16; G06F 3/0481
See application file for complete search history.

(56) References Cited

U.S. PATENT DOCUMENTS

| | | | | |
|---|---|---|---|---|
| 9,794,496 | B2* | 10/2017 | Soffer | .................... H04N 5/268 |
| 2012/0030328 | A1* | 2/2012 | Jiang | ................... H04L 65/1069 |
| | | | | 709/223 |
| 2013/0016858 | A1* | 1/2013 | Masaki | .............. H04N 21/4126 |
| | | | | 381/104 |
| 2013/0027314 | A1* | 1/2013 | Masaki | ........... H04N 21/43615 |
| | | | | 345/168 |

(Continued)

OTHER PUBLICATIONS

IOS AirPlay Jul. 2, 2014.*

*Primary Examiner* — David Choi
(74) *Attorney, Agent, or Firm* — Sughrue Mion, PLLC

(57) ABSTRACT

A user terminal apparatus including: a display configured to display an execution screen of a music application; a user interface configured to receive a user command; a communicator configured to perform communication with an external display apparatus; and a processor configured to: provide, in response to the user command, a user interface (UI) screen including information regarding the external display apparatus, the external display apparatus being connected to the user terminal apparatus through a network, and control the communicator to transmit identification information of a music content provided on the music application execution screen to the external display apparatus selected on the UI screen.

19 Claims, 13 Drawing Sheets

(56) References Cited

U.S. PATENT DOCUMENTS

| | | | |
|---|---|---|---|
| 2013/0144719 A1* | 6/2013 | Yeo | G06Q 30/02 705/14.54 |
| 2014/0372621 A1* | 12/2014 | Jiang | H04L 65/1059 709/228 |
| 2014/0373040 A1* | 12/2014 | Lin | H04N 21/4126 725/25 |
| 2015/0052565 A1* | 2/2015 | Farrell | H04L 65/608 725/74 |
| 2015/0077635 A1* | 3/2015 | Wu | H04N 5/602 348/552 |
| 2015/0095510 A1* | 4/2015 | Bhorkar | H04L 12/2805 709/231 |
| 2015/0200977 A1* | 7/2015 | Wait | G06F 3/0482 715/716 |
| 2015/0310854 A1* | 10/2015 | Takemura | G10L 15/22 704/254 |
| 2016/0080806 A1* | 3/2016 | Ozeki | H04N 21/25808 725/14 |
| 2016/0124703 A1* | 5/2016 | So | G06F 3/165 715/716 |

* cited by examiner

USER TERMINAL APPARATUS, DISPLAY APPARATUS CONNECTED TO USER TERMINAL APPARATUS, SERVER, CONNECTED SYSTEM, CONTROLLER, AND CONTROLLING METHOD THEREOF

CROSS-REFERENCE TO RELATED APPLICATIONS

This application claims priority from Korean Patent Application No. 10-2014-0152141, filed in the Korean Intellectual Property Office on Nov. 4, 2014, the disclosure of which is incorporated herein by reference in its entirety.

BACKGROUND

1. Field

Aspects of one or more exemplary embodiments relate to a user terminal apparatus, a display apparatus connected to a user terminal apparatus, a connected system, and a controlling method thereof, and more particularly, to a user terminal apparatus capable of providing an additional service to a user by being connected to another apparatus, a display apparatus connected to a user terminal apparatus, a related system, and a controlling method thereof.

2. Description of the Related Art

Various user terminal apparatuses which may play and provide music have been introduced. For example, a smart phone allows a user to search for various music through a music application, receive music through streaming in real time, and listen to downloaded music using a downloading service. In order to satisfy users' needs, a user terminal apparatus not only plays music but also provides information related to the music, such as an album and lyrics corresponding to the music, on a display screen.

However, due to the restrictions on the size of the display screen of a user terminal apparatus, such as a smart phone, it is difficult to provide a user with various information related to music content. For example, it is difficult to display detailed music information, like the artist and album of the music, and various content, such as a music video, live performance images, other music by the same artist, etc., at a same time. Thus, there is a limit to the amount of information related to music provided through a music application while the music is played. As a result, when a user wishes to search for related information, the user needs to search for the corresponding information one at a time, which inconveniences to user.

Accordingly, there is a need for a method to allow a user to view various information related to a music content which is currently played through a user terminal apparatus on a large display screen.

SUMMARY

An aspect of one or more exemplary embodiments relates to a user terminal apparatus which connects a display apparatus to display various information related to a music content which is provided on the user terminal apparatus, a display apparatus connected to a user terminal apparatus, a connected system, and a controlling method thereof.

According to an exemplary embodiment, there is provided a user terminal apparatus including: a display configured to display an execution screen of a music application; a user interface configured to receive a user command; a communicator configured to perform communication with an external display apparatus; and a processor configured to: provide, in response to the user command, a user interface (UI) screen including information regarding the external display apparatus, the external display apparatus being connected to the user terminal apparatus through a network, and control the communicator to transmit identification information of a music content provided on the music application execution screen to the external display apparatus selected on the UI screen.

The processor may be further configured to, in response to the external display apparatus being selected while a music content is played by the music application, control the communicator to transmit identification information of the played music content to the selected external display apparatus.

The processor may be further configured to, in response to the external display apparatus being selected while a music content is searched for on the music application execution screen, control the communicator to transmit identification information of the searched for music content to the selected external display apparatus.

The processor may be further configured to, in response to a predetermined graphical user interface (GUI) provided on one area of the execution screen being selected, provide the UI screen, and the predetermined GUI may include an icon representing the external display apparatus.

The music content may include at least one of a music content pre-stored in the user terminal apparatus, a music content shared by a Digital Living Network Alliance (DLNA), a music content provided through streaming, and a music content provided through a radio channel.

According to an exemplary embodiment, there is provided a controlling method of a user terminal apparatus including: providing an execution screen of a music application according to a predetermined event; providing, in response to a user command being input to the execution screen, a user interface (UI) screen including information regarding an external display apparatus, the external display apparatus being connected to the user terminal apparatus through a network; and transmitting identification information of a music content provided on the music application execution screen to the external display apparatus which is selected on the UI screen.

The transmitting the identification information may include transmitting, in response to the external display apparatus being selected while a music content is played by the music application, identification information of the played music content to the selected external display apparatus.

The transmitting the identification information may include transmitting, in response to the external display apparatus being selected while a music content is searched for on the music application execution screen, identification information of the searched for music content to the selected external display apparatus.

The providing the UI screen may include providing, in response to a predetermined graphical user interface (GUI) provided on one area of the execution screen being selected, the UI screen, and the predetermined GUI may include an icon representing the external display apparatus.

The music content may include at least one of a music content pre-stored in the user terminal apparatus, a music content shared by a Digital Living Network Alliance (DLNA), a music content provided through streaming, and a music content provided through a radio channel.

According to an exemplary embodiment, there is provided a display apparatus including: a display; a communicator configured to perform communication with a user terminal apparatus, the user terminal providing an execution screen of a music application; and a processor configured to, in response to identification information of a music content provided through the execution screen being received from the user terminal apparatus, control the display to display information related to the music content based on the received identification information.

The processor may be further configured to, in response to the identification information being received while the display apparatus is turned off, control the display apparatus to turn on and control the display to display the information related to the music content.

The processor may be further configured to, in response to the identification information being received while an image is displayed on the display, control the display to display a user interface (UI) screen that provides the information related to the music content on a portion of a display screen of the display.

The information regarding the music content may include at least one of detailed information on the music content, information on an application capable of servicing the music content, and information on Video On Demand (VOD) content related to the music content.

The processor may be further configured to, in response to a music source of the music content being received from the user terminal apparatus, control the received music source to be output through an external speaker.

According to an exemplary embodiment, there is provided a controlling method of a display apparatus including: receiving, from a user terminal apparatus, identification information of a music content provided through an execution screen of a music application, the execution screen being provided on the user terminal apparatus; and displaying information related to the music content based on the received identification information.

The displaying may include, in response to the identification information being received while the display apparatus is turned off, turning on the display apparatus and displaying the information related to the music content.

The displaying may include, in response to the identification information being received while an image is displayed, displaying a user interface (UI) screen that provides the information related to the music content on a portion of a display screen of the display apparatus.

The information related to the music content may include at least one of detailed information on the music content, information on an application capable of servicing the music content, and information on Video On Demand (VOD) content related to the music content.

According to an exemplary embodiment, there is provided a connected system including: a display apparatus; and a user terminal apparatus configured to: display a music application execution screen, and transmit identification information of a music content provided on the execution screen to the display apparatus in response to a user command, wherein the display apparatus is configured to, in response to receiving the identification information of the music content from the user terminal apparatus, display information related to the music content which is for searched based on the received identification information.

According to an exemplary embodiment, there is provided a user terminal including: a display; a user interface; a transceiver; and a processor configured to: execute a music application, control the display to display information corresponding to an external display apparatus connected to the user terminal, and control, in response to receiving a user command through the user interface selecting the external display apparatus, the transceiver to transmit identification information corresponding to a music content provided by the music application to the external display apparatus.

According to an exemplary embodiment, there is provided a display apparatus including: a display; a transceiver; and a processor configured to control, in response to identification information corresponding to a music content being received through the transceiver, the display to display information related to the music content, the information related to the music content being searched for based on the received identification information.

The processor may be further configured to search for the information related to the music content based on the received identification information.

According to an exemplary embodiment, there is provided a server including: a transceiver; and a processor configured to: search, in response to identification information corresponding to a music content being received through the transceiver for a first apparatus, for information related to the music content, and control the transceiver to transmit the searched for information to a second apparatus, the second apparatus being different from the first apparatus.

The first apparatus may include a user terminal, and the second apparatus may include a display apparatus.

According to an exemplary embodiment, there is provided a controller including: a processor; and a memory storing a program, wherein, when the program is executed by the processor, the processor is configured to: execute a music application, control a display of a user terminal to display information corresponding to an external display apparatus connected to the user terminal, and control, in response to receiving a user selection of the external display apparatus, the transmission of identification information corresponding to a music content provided by the music application to the external display apparatus.

According to an exemplary embodiment, there is provided a controller including: a processor; and a memory storing a program, wherein, when the program is executed by the processor, the processor is configured to: search, in response to identification information corresponding to a music content being received, for information related to the music content based on the received identification information, and control a display apparatus to display the searched for information related to the music content.

According to the above-described various exemplary embodiments, a user terminal apparatus may be provided with various information related to a music content selected by a user through a large screen of a display apparatus and thus, user convenience can be enhanced.

BRIEF DESCRIPTION OF THE DRAWINGS

The above and/or other aspects of one or more exemplary embodiments will be more apparent by describing certain exemplary embodiments with reference to the accompanying drawings, in which.

DETAILED DESCRIPTION

Figure 1:
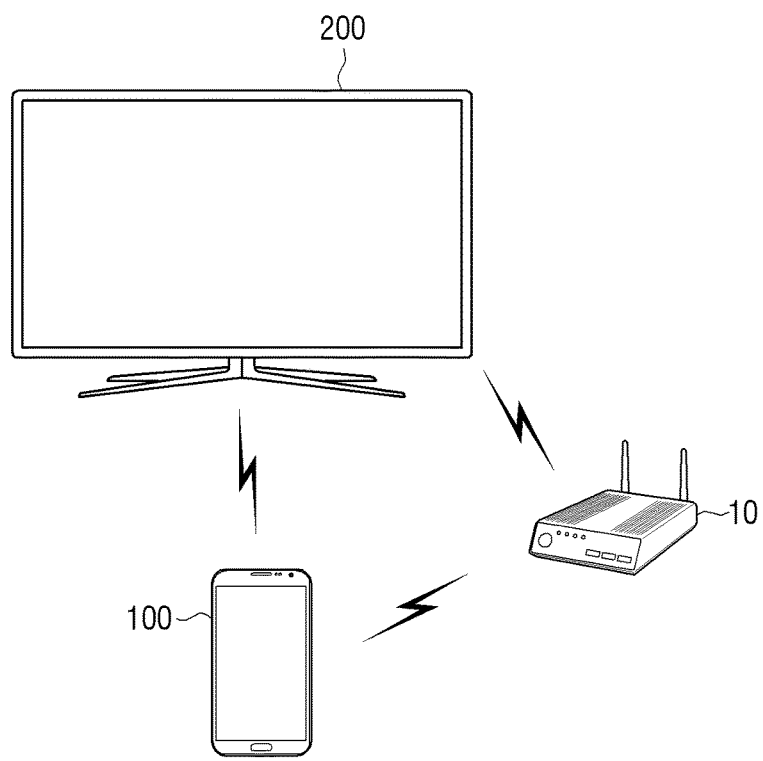
FIG. 1 is a view provided to explain a connected system including a user terminal apparatus and a display apparatus according to an exemplary embodiment.

One or more exemplary embodiments may be variously and diversely modified. Accordingly, specific exemplary embodiments are illustrated in the drawings and are described in detail in the detailed description. However, it is to be understood that the present disclosure is not limited to the specific exemplary embodiments described herein, but includes all modifications, variations, equivalents, and substitutions without departing from the scope and spirit of the present disclosure. Also, well-known functions or constructions are not described in detail since they would obscure the disclosure with unnecessary detail.

Hereinafter, one or more exemplary embodiments will be described in detail with reference to the accompanying drawings.

FIG. 1 is a view provided to explain a connected system including a user terminal apparatus and a display apparatus according to an exemplary embodiment.

The connected system in FIG. 1 includes a user terminal apparatus 100, e.g., a user terminal, a display apparatus 200, and an access point (AP) 10.

The user terminal apparatus 100 is configuration to operate a music application. The user terminal apparatus 100 may be realized as a display apparatus which can operate a music application, such as a smart phone, a Personal Digital Assistant (PDA), a tablet personal computer (PC), etc. The user terminal apparatus 100 may be connected to the display apparatus 200 to perform communication with the display apparatus 200. The user terminal apparatus 100 may transmit identification information of a music content, which is provided on a music application execution screen, to the display apparatus 200. The identification information refers to information for the display apparatus 200 to identify a music content which is selected by a user after executing a music application. For example, the identification information may refer to tag information which includes information regarding a singer, song title, etc.

In addition, the user terminal apparatus 100 may perform a remote control function with respect to the display apparatus 200 if a music application provides a remote control function or a separate application which provides a remote control function is operated. In addition, the user terminal apparatus 100 may directly provide a remote control mode regarding the display apparatus 200.

The display apparatus 200 displays information related to a music content. The display apparatus 200 may receive identification information of a music content which is provided through a music application from the user terminal apparatus 100, and display information related to a music content which is searched for based on the received identification information.

The display apparatus 200 may be realized as a digital TV as illustrated in FIG. 1, but is not limited thereto. The display apparatus 200 may be realized as various types of apparatuses with a display function, such as, as non-limiting examples, a PC, a navigation system, a kiosk, a Digital Information Display (DID), etc.

In addition, the display apparatus 200 may utilize various functions such as web surfing, Video On Demand (VOD) watching, Social Networking Service (SNS), etc. in combination with an internet connection function. Accordingly, various information transmitted via the Internet may be displayed on a larger panel.

When identification information is received from the user terminal apparatus 100, the display apparatus 200 may search content stored in the display apparatus 200 using the received identification information, search an external server connected to the display apparatus 200 or a web site connected to Internet, and display the search result. The search result is information related to a music content which is recognized through the identification information, and may include detailed information related to a music content, such as a singer, a song title, lyrics, an album title, information on an application capable of servicing music content, such as music source streaming, and VOD content information related to a music content. The display apparatus 200 may display a user interface (UI) screen including the above information on a full display screen or a portion of the display screen.

In addition, even if the display apparatus 200 is turned off, upon receiving identification information from the user terminal apparatus 100, the display apparatus 200 may process the received identification information and generate a turn-on signal for turning on the display apparatus 200. When the display apparatus 200 is turned on according to the generated turn-on signal, the display apparatus 200 may search for information related to the corresponding music content using the identification information and display the search result.

The access point (hereinafter, referred to as AP 10) connects the user terminal apparatus 100 and the display apparatus 200 on the same network. The AP 10 serves as a bridge by connecting the user terminal apparatus 100 and the display apparatus 200 to a network using Wi-Fi, etc. The display apparatus 200 is connected to a server or the web through the AP 10 to search, download, or display information related to a music content which is recognized through the identification information.

The above-described connected system of the user terminal apparatus 100 and the display apparatus 200 allows a user to view various information related to music that the user is listening to through a large display panel at a glance and obtain related information easily. Thus, the inconvenience of searching for information through a small screen of the user terminal apparatus may be reduced. In addition, a plurality of users may share information related to a music that they are listening to through a large display screen. In addition, even if the screen of the user terminal apparatus 100 is turned off, the users may obtain related information while listening to the music. In addition, the users may obtain information related to music that they are listening to while performing another function on the display apparatus 200 or on the user terminal apparatus 100. Thus, user convenience can be enhanced.

Hereinafter, exemplary configurations of the user terminal apparatus 100 and the display apparatus 200 will be described in detail with reference to FIGS. 2 and 3.

Figure 2:
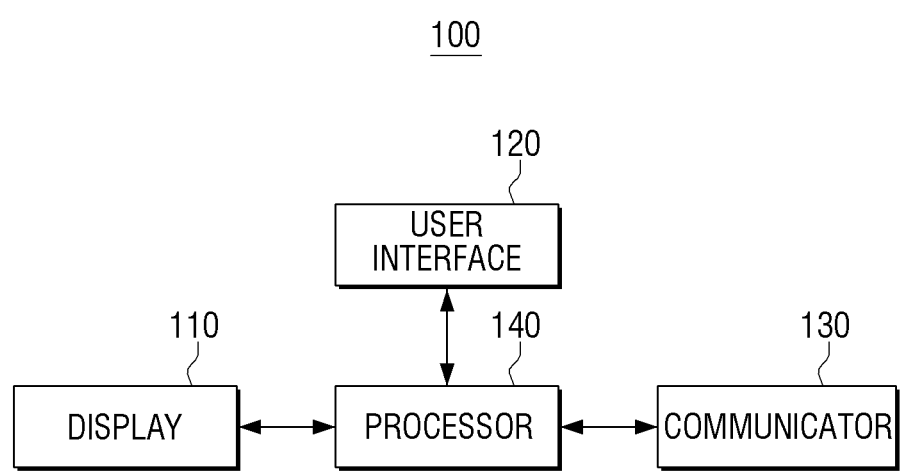
FIG. 2 is a block diagram of a user terminal apparatus according to an exemplary embodiment.

FIG. 2 is a block diagram of a user terminal apparatus according to an exemplary embodiment.

Referring to FIG. 2, the user terminal apparatus 100 includes a display 110, a user interface 120, a communicator 130, and a processor 140.

The display 110 provides a music application execution screen. The display 110 may be realized as a Liquid Crystal Display (LCD), an Organic Light Emitting Diodes (OLED) display, etc. The music application refers to an application which may provide a music service. The music application may perform not only a music play function, but also other various functions such as searching music, providing music, etc.

In addition, when a user command is input while a music application is executed, the display 110 may provide a UI screen including information regarding an external display apparatus which is connected to the user terminal apparatus 100 on the same network.

Specifically, if a user wishes to obtain information related to a music content which is searched for or played on a music application execution screen and the user performs a particular operation, information regarding a display apparatus which is connected to the same network and may display the related information may be displayed. If a plurality of display apparatuses are connected to the same network, a UI screen may be displayed in the form of selection window where a plurality of display apparatuses are listed so that a user may select one of the plurality of display apparatuses. If there is only one display apparatus which is connected to the same network and capable of displaying the related information, simply a message indicating that the display apparatus is connected may be displayed or a UI screen regarding the connected external display apparatus may not be provided.

The user interface 120 receives a user command. The user interface 120 may be realized, as non-limiting examples, as a touch pad, a key pad including various function keys, number keys, special keys, character keys, etc., or a touch screen. If the user interface 120 is realized as a touch screen, the user interface 120 may be included in the display 110 and may receive a user command as a user touches a point of a screen displayed through the display 110 using a finger or a stylus pen.

The communicator 130, e.g. a transceiver, performs communication with the display apparatus 200. In particular, the communicator 130 may transmit identification information of a music content which is provided on a music application execution screen to the display apparatus 100 which is selected on the UI screen.

The communicator 130 may perform communication with the display apparatus 200 according to a near-field wireless communication method such as RF communication including Bluetooth, Zigbee, Wi-Fi, etc. or IR communication and so on. To do so, the communicator 130 may include a communication module which can be used in each communication method.

If communication is performed according to a Bluetooth communication method, the communicator 130 may be paired with the display apparatus 200 through a Bluetooth communication module to be in a state where the communicator 130 can communicate with the display apparatus 200. If a Wi-Fi communication module is included, the communicator 130 may be in a state where it can communicate with the display apparatus 200 through a Wi-Fi communication module. The communicator 130 may be connected directly to the display apparatus 200 through a Wi-Fi communication module and perform communication, or may perform communication with the display apparatus 200 through a network using the AP 10.

Hereinafter, an exemplary embodiment where the user terminal apparatus 100 communicates with the display apparatus 200 according to a communication method using Wi-Fi will be described, but this is only an example. The communication can be performed using various communication methods as described above.

The processor 140 controls an overall operation of the user terminal apparatus 100.

In particular, the processor 140 may control the display 110 to display a UI screen including information regarding the external display apparatus 200 which is connected to the user terminal apparatus 100 on the same network according to a user command which is input through the user interface 120. In addition, when a user selects the external display apparatus 200 on the UI screen, the processor 140 may control the communicator 130 to transmit identification information of a music content which is provided on a music application execution screen to the selected external display apparatus 200.

The identification information of a music content may be identification information regarding a music content which is played on a music application execution screen or identification information regarding a music content which is searched for by a user on a music application execution screen.

For example, if a song of "ABC" is played in a music application, the identification information may be identification information regarding "ABC". A song being played may include the song being played being paused or stopped. If a song of "DEF" is searched for by a user in a music application which is in operation, the identification information may be identification information regarding "DEF".

In addition, if a predetermined graphical user interface (GUI) provided on one area of a music application execution screen is selected, the processor 140 may provide a UI screen which represents information regarding the above-described external display apparatus 200. Specifically, the predetermined GUI may be provided as an icon representing an external display apparatus on an area of the display 110. For example, the GUI may be an icon in the form of TV. In this case, if a user wishes to obtain information related to a music content which is provided on the music application execution screen and presses the TV-shaped icon, a UI screen window displaying information regarding the display apparatus 200 which is connected to the user terminal apparatus 100 may be overlaid and displayed with the music application execution screen.

The music content provided by a music application may include a music content which is pre-stored in the user terminal apparatus 100, a music content which is shared by a Digital Living Network Alliance (DLNA), a music content which is provided through streaming, and a music content which is provided through a radio channel. Here, the DLNA is a network technology standard for media transmission and control between terminals in a household, and refers to a protocol technology for sharing content, such as music content. The technical feature of an exemplary embodiment may also be applied when shared music is played in another terminal. In addition, if streaming music content or a music application serviced by a music application supports a radio service, the technical feature of an exemplary embodiment may also be applied when a music content provided through a radio channel is played. In the case of a music content which is provided through a radio channel, the user terminal apparatus 100 may receive identification information regarding selected music for each radio channel from a radio broadcasting station and transmit the identification information to the display apparatus 200. Alternatively, the display apparatus 200 may receive the identification information directly from the radio broadcasting station.

Figure 3:
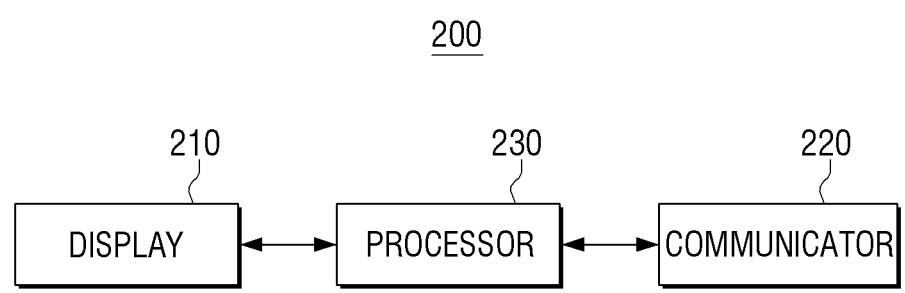
FIG. 3 is a block diagram of a display apparatus according to an exemplary embodiment.

FIG. 3 is a block diagram of a display apparatus according to an exemplary embodiment.

Referring to FIG. 3, the display apparatus 200 includes a display 210, a communicator 220, and a processor 230.

The display 210 displays various content. The display 210 displays information related to a searched for music content, and may provide the related information on a full screen of the display or on a portion of the screen. The display 120 may be realized as an LED display, an OLED display, and so on, but is not limited thereto. In addition, the display 120 may include a driving circuit, a backlight unit, and so on, which can be configured in the form of a-si TFT, low temperature poly silicon (LTPS) TFT, organic TFT (OTFT), etc.

The display 210 may display a UI screen where searched information related to a music content is categorized. The layout of the UI screen, that is, the size and location of the UI screen, may be determined according to the characteristics of the information categorized. Here, the searched related information may be categorized as detailed information regarding a music content, information on an application capable of servicing a music content, and VOD content information related to a music content based on the characteristics of the information.

In addition, if a user is watching a TV program, the display 210 may display a UI screen one area of a display screen so as not to interfere with the user's watching the TV program. For example, the display 210 may keep displaying the TV program and overlay and display a UI screen including some of the searched related information on an upper, lower, or side area of the screen. Alternatively, the display 210 may reduce the size of the TV broadcast screen which has been displayed to a certain size, and dispose and display the reduced TV broadcast screen on an area of the layout constituting the UI screen.

The communicator 220, e.g., a transceiver, performs communication with the user terminal apparatus 100. The communicator 220 may receive identification information of a music content provided from a user terminal apparatus which provides a music application execution screen.

The communicator 220 may perform communication with the user terminal apparatus 100 according to a near-field wireless communication method such as RF communication including Bluetooth, Zigbee, Wi-Fi, etc. or IR communication and so on. To do so, the communicator 220 may include a communication module which can be used in each communication method, and may include both an IR communication module and an RF communication module.

The display apparatus 200 includes a communication module to perform communication using the same method as the communicator 130 of the user terminal apparatus 100, and the display apparatus 200 according to an exemplary embodiment may include a Wi-Fi communication module.

Exemplary methods for the display apparatus 200 to perform communication with the user terminal apparatus 100 have been described above with reference to FIG. 2.

The communicator 220 may be connected to the Internet via the AP10 and receive various information related to a music content from the web site in real time. If the communicator 220 receives identification information of a music content from the user terminal apparatus 100, the communicator 220 may search and download information related to the corresponding music content from the web based on the received identification information. There is no limit to the type of content which are received through the AP10, and detailed information regarding a music content which can be provided by the user terminal apparatus 100, for example, information regarding a singer, a song, a songwriter, and a lyricist of the corresponding music, and information regarding an album including the corresponding music content may be provided. The information on an application capable of servicing a music content may be displayed all the time regardless of identification information, and VOD content information related to a music content may be provided.

The communicator 220 may receive information related to a music content directly from the user terminal apparatus 100. In addition, the identification information transmitted from the user terminal apparatus 100 may go through an external server, and a search on the corresponding music content may be performed in the external server. In this case, the communicator 220 receives the search result from the external server.

The processor 230 controls an overall operation of the display apparatus 200.

In particular, if the identification information of a music content is received from the user terminal apparatus 100 which provides a music application execution screen, the processor 230 may perform a search based on the received identification information, and control the display 210 to display information related to a searched for music content.

In addition, in order to receive a signal transmitted from the user terminal apparatus 100 even when the display apparatus 200 is turned off, the display apparatus 200 may receive identification information of a music content through the communicator 220 which maintains a standby mode state. In this case, the processor 230 may turn on the display apparatus 200 by processing the received identification information and generating a turn-on signal. Further, the processor 230 may perform a search using the received identification information, and control the display 210 to display information related to a searched for music content. Accordingly, even if the power of the display apparatus 200 is turned off, a user may be provided with the related information from the display apparatus 200 by performing just one operation without needing to perform a separate operation of turning on the display apparatus 200.

In addition, if the identification information of a music content is received while an image is displayed on the display 210, the processor 230 may control the display 210 to display a UI screen which provides information related to the music content on one area of the display screen. Accordingly, a user may be provided with information related to the music content without being significantly interrupted.

Figure 4:
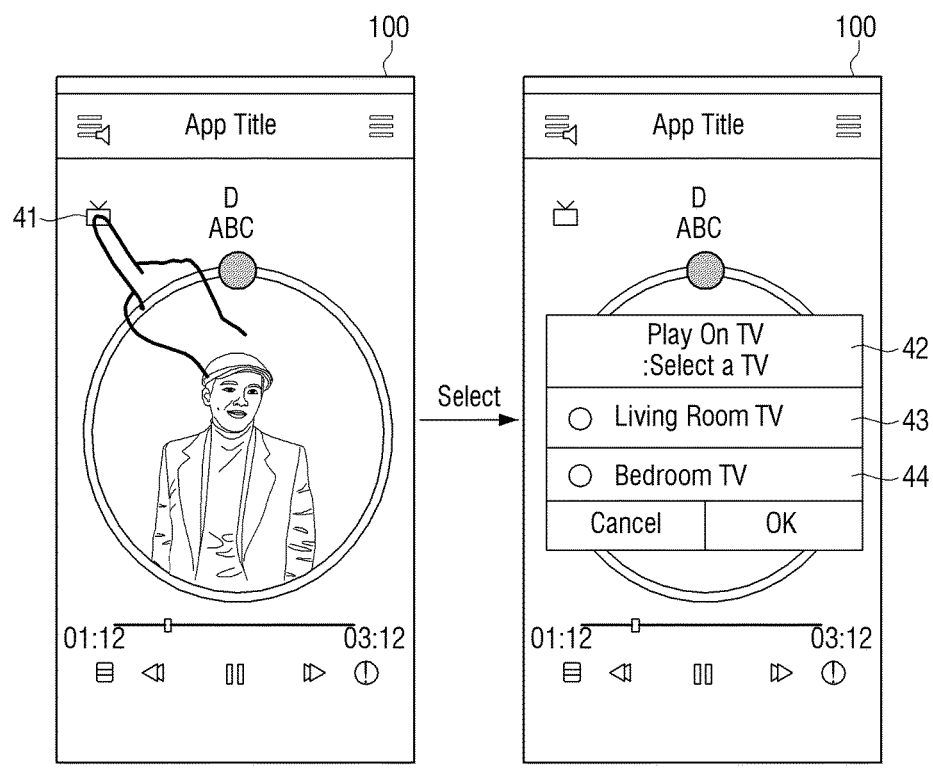
FIG. 4 is a view provided to explain a method of connecting a display apparatus in a music application which is provided by a user terminal apparatus according to an exemplary embodiment.

FIG. 4 is a view provided to explain a method of connecting a display apparatus in a music application which is provided by a user terminal apparatus according to an exemplary embodiment.

Referring to FIG. 4, the user terminal apparatus 100 may display a screen where a music application is executed. The music application which is being executed in FIG. 4 is playing a song of 'D' by a singer of 'ABC'. In this case, the user terminal apparatus 100 may provide a predetermined GUI 41 on one area of the execution screen, and if a user wishes to obtain information related to the song of 'D' by 'ABC', the user may select the GUI 41 by a touch operation, etc. In this case, the predetermined GUI 41 is an icon representing an external display apparatus, and may be provided in the form of TV or in the form of text, such as 'connect TV'.

If the user selects the GUI 41, the user terminal apparatus 100 may provide a UI including information regarding the external display apparatus which is connected on the same network. For example, if there are a plurality of external display apparatuses, a selection window 42 for selecting one of 'Living Room TV 43' and 'Bedroom TV 44' may be overlaid and displayed with the existing execution screen as illustrated in FIG. 4.

Figure 5:
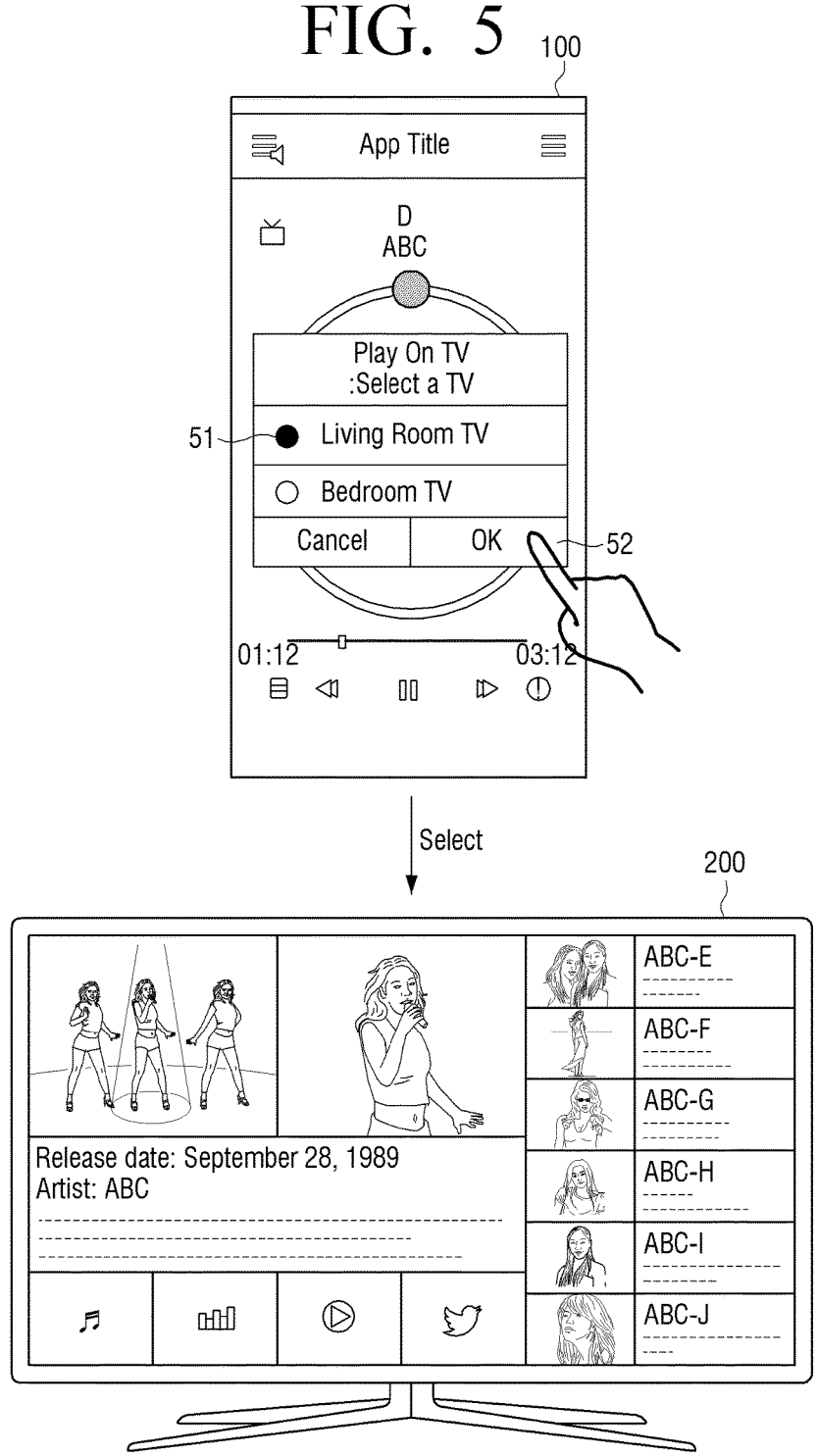
FIG. 5 is a view provided to explain a method of displaying information related to a music content on a display apparatus according to an exemplary embodiment.

FIG. 5 is a view provided to explain a method of displaying information related to a music content on a display apparatus according to an exemplary embodiment.

If a selection button 51 is touched and an OK button 52 is selected in order to select 'Living Room TV 43' on the selection window 42 provided on a music application which is being executed in the user terminal apparatus 100, the user terminal apparatus 100 transmits identification information to the display apparatus 200 corresponding to the Living Room TV 43. When the display apparatus 200 receives the identification information, related information which has been searched using the received identification information may be displayed as illustrated in FIG. 5.

Figure 6:
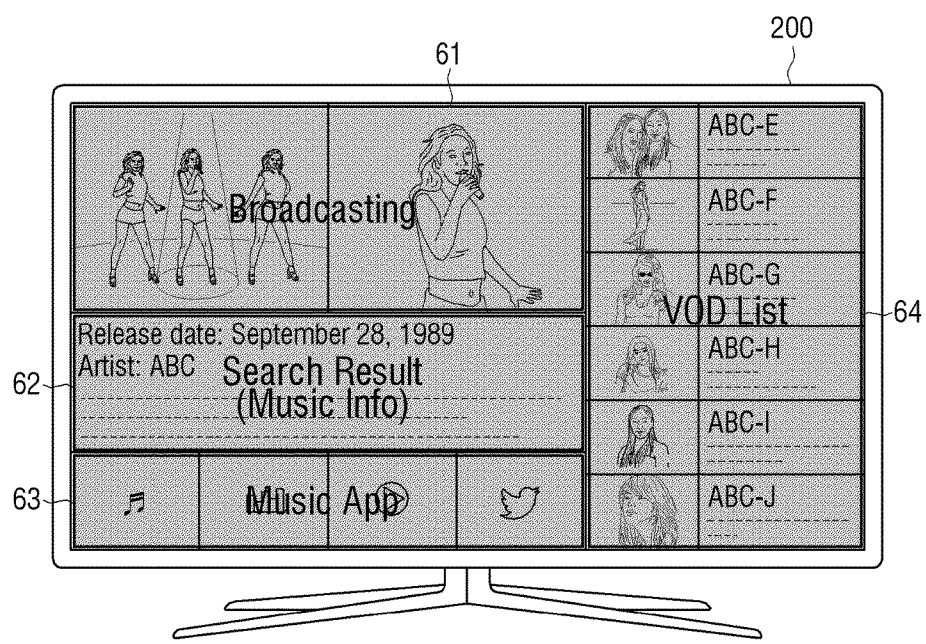
FIG. 6 is a view provided to explain various information related to a music content which is displayed on a display apparatus according to an exemplary embodiment.

FIG. 6 is a view provided to explain various information related to a music content which is displayed on a display apparatus according to an exemplary embodiment.

The display apparatus 200 may display a UI screen where information related to a music content is categorized. As illustrated in FIG. 6, the display apparatus 200 may display a UI screen which provides a related broadcast channel image 61, detailed information regarding the corresponding music and search result list 62, an application for servicing a music content 63, and VOD content list related to the corresponding music content 64 from among information related to a music content which is searched for based on the received identification information. The VOD content list 64 may display VOD content regarding different songs (E, F, G, H, I, J, etc.) of the same singer.

The layout of each category in the UI screen may vary in terms of the size and location according to the characteristics of the information.

Figure 7:
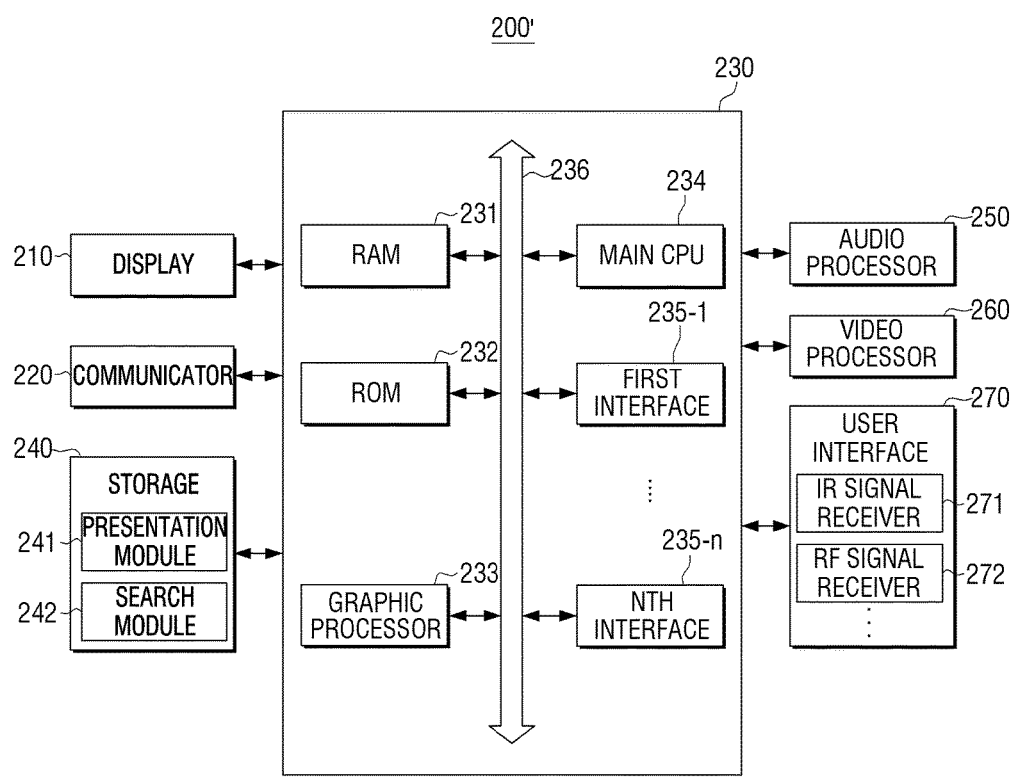
FIG. 7 is a block diagram of a display apparatus according to another exemplary embodiment.

FIG. 7 is a block diagram illustrating a configuration of a display apparatus according to another exemplary embodiment. As illustrated in FIG. 7, a display apparatus 200' includes the display 210, the communicator 220, the processor 230, a storage 240, an audio processor 250, a video processor 260, and a user interface 270. Hereinafter, the descriptions which are overlapped with the above descriptions regarding FIGS. 2 and 3 will not be provided.

The storage 240 stores various modules to drive the display apparatus 200'. The storage 240 may store software including a base module, a presentation module 241, a search module 242, etc.

The base module refers to a basic module which processes a signal transmitted from hardware components included in the display apparatus 200', and transmits the processed signal to an upper layer module.

The presentation module 241 is a module configured to compose a display screen. The presentation module 241 includes a multimedia module for reproducing multimedia content, and a UI rendering module for GUI and graphic processing.

The search module 242 searches for information related to a music content based on received identification information. The search module 242 may perform web browsing, access a web server, and search information, and may include a search engine therein.

The processor 230 controls an overall operation of the display apparatus 200 using various programs stored in the storage 240.

As illustrated in FIG. 7, the processor 230 includes a random-access memory (RAM) 231, a read-only memory (ROM) 232, a graphic processor 233, a main central processing unit (CPU) 234, first to nth interface 235-1~235-n, and a bus 236. The RAM 231, the ROM 232, the graphic processor 233, the main CPU 234, and the first to the nth interface 235-1~235-n may be interconnected through the bus 236.

The ROM 231 stores a set of commands for system booting. The main CPU 234 copies various application programs stored in the storage 240 to the RAM 231, and performs various operations by executing the application programs copied to the RAM 231. For example, the main CPU 234 may copy an application program connected to a music application of the user terminal apparatus 100, stored in the storage 240, in the RAM 231, and display information related to a music content included in identification information by executing an application program copied to the RAM 231.

The graphic processor 233 generates a screen including various objects such as an icon, an image, a text, etc., using a computing unit (e.g., a calculator) and a rendering unit (e.g., a renderer). The computing unit computes property values such as coordinates, shapes, sizes, and colors of each object to be displayed according to the layout of the screen. The rendering unit generates a screen with various layouts including the objects based on the property values computed by the computing unit.

The main CPU 234 accesses the storage 240, and performs booting using an Operating System (O/S) stored in the storage 240. In addition, the main CPU 234 performs various operations using various programs, content, data, etc., stored in the storage 240.

The first to the nth interface 235-1 to 235-n are connected to the above-described various elements. One of the first to nth interfaces 235-1~235-n may be a network interface connected to an external apparatus via a network.

The audio processor 250 processes audio data. The audio processor 250 may perform various processing with respect to audio data, such as decoding, amplification, noise filtering, etc. The audio processor 250 may include a plurality of audio processing modules in order to process audio corresponding to a plurality of content.

The video processor 260 processes various image content received from an external source, such as the Internet or an external server, or internally, such as from the storage 240. The video processor 260 may perform various image processing operations with respect to image data, such as decoding, scaling, noise filtering, frame rate conversion, resolution conversion, etc. The video processor 260 may include a plurality of video processing modules in order to process video corresponding to a plurality of content.

The user interface 270 detects a user interaction. In particular, the user interface 270 may include various interaction detecting apparatuses such as an IR signal receiver 271, an RF signal receiver 272, etc., as illustrated in FIG. 7.

The display apparatus 200' may receive various signals to control the display apparatus 200' including a turn-on signal from a remote controller or the user terminal apparatus 100. The display apparatus 200' may receive a signal including identification information from the user terminal apparatus 200 through the RF signal receiver 272. The RF signal receiver 272 may include a module for receiving a Wi-Fi signal, and may be included in the communicator 220.

Figure 8:
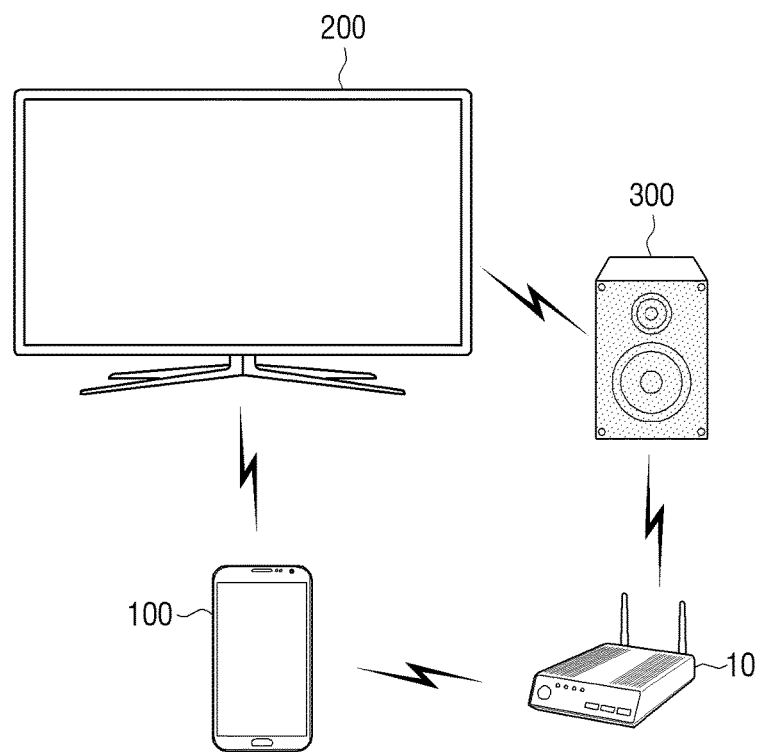
FIG. 8 is a view provided to explain a connected system including a user terminal apparatus and a display apparatus according to another exemplary embodiment.

FIG. 8 is a view provided to explain a connected system including a user terminal apparatus and a display apparatus according to another exemplary embodiment.

As illustrated in FIG. 8, a connected system may further include a speaker 300. The user terminal apparatus 100, the display apparatus 200 and the external speaker 300 may be connected to the same network through the AP 10.

The external speaker 300 may be connected to a music application which is being executed, and output a music source which is played in the user terminal apparatus 100 or the display apparatus 200. In other words, according to an exemplary embodiment, the user terminal apparatus 100, the display apparatus 200 and the external speaker 300 constitutes a connected system for connecting each other on the same network through a music application.

If a user selects a desired content including audio in the display apparatus 200 where information related to music content searched for by a user is displayed, the display apparatus 200 may select one of a speaker which is provided within the display apparatus 200 or connected via cable and the external speaker 300 connected on the same network and output the audio. Alternatively, a selection screen for the user to select a speaker through which the audio is output may be provided.

According to an exemplary embodiment, information related to a music content provided by a music application which is being executed in the user terminal apparatus 100 is displayed through the display apparatus 200, but the opposite may also be true. For example, the information related to a music content provided by a music application which is being executed in the display apparatus 200 may be displayed through the user terminal apparatus 100.

Figure 9:
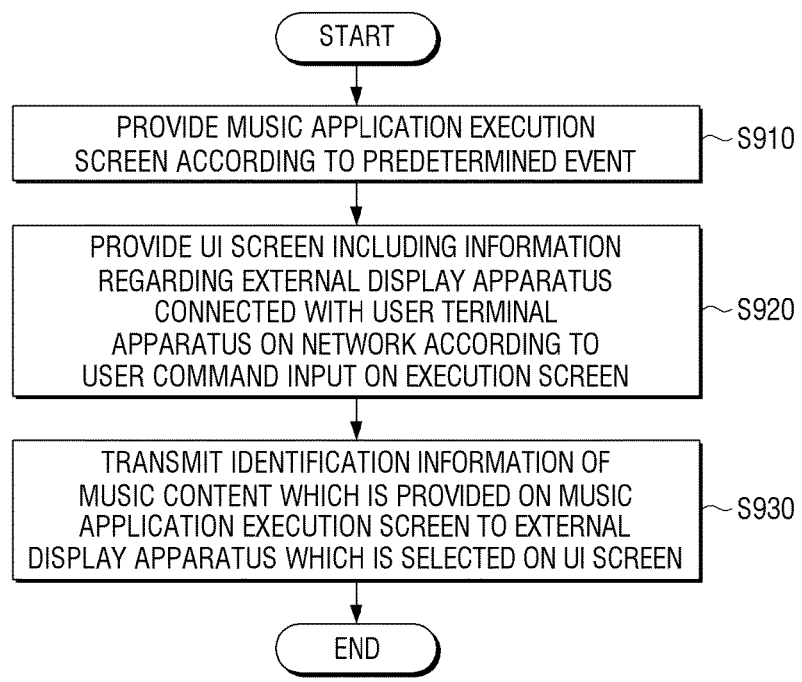
FIG. 9 is a flowchart provided to explain a controlling method of a user terminal apparatus according to an exemplary embodiment.

FIG. 9 is a flowchart provided to explain a controlling method of a user terminal apparatus according to an exemplary embodiment.

A music application execution screen is provided according to a predetermined event (S910). The predetermined event may be an event where a user executes a music application on the user terminal apparatus 100 and searches or selects music.

Subsequently, a UI screen including information regarding an external display apparatus which is connected to the user terminal apparatus 100 over a network is provided according to a user command input on the execution screen (S920). The UI screen may be provided when a predetermined GUI provided on one area of the execution screen is selected, and the predetermined GUI may be an icon representing an external display apparatus.

The identification information of a music content provided on the music application execution screen is transmitted to the external display apparatus 200 which is selected on the UI screen (S930). Here, the music content may include at least one of a music content which is pre-stored in the user terminal apparatus, a music content which is shared by a Digital Living Network Alliance (DLNA), a music content which is provided by streaming, and a music content which is provided through a radio channel.

Figure 10:
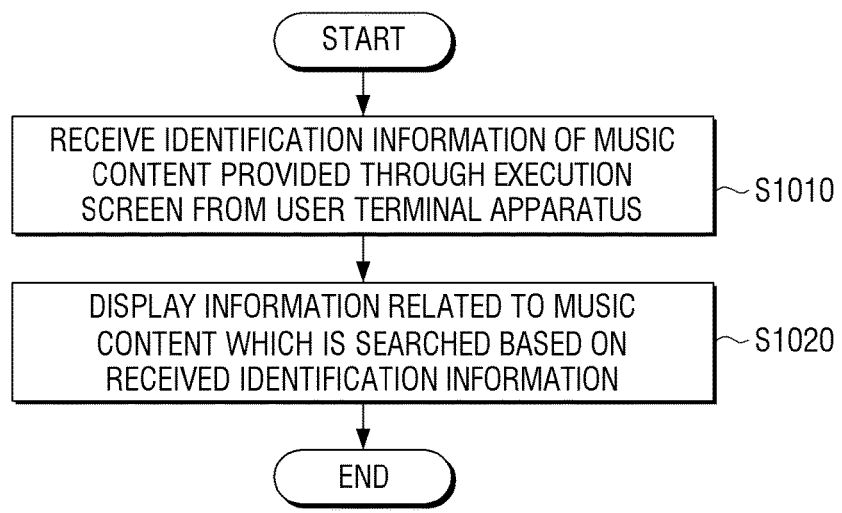
FIG. 10 is a flowchart provided to explain a controlling method of a display apparatus according to an exemplary embodiment.

FIG. 10 is a flowchart provided to explain a controlling method of a display apparatus according to an exemplary embodiment.

First, the identification information of a music content provided through an execution screen of a user terminal apparatus 100 is received from the user terminal apparatus 100 (S1010). Subsequently, information related to a music which is searched based on the received identification information is displayed (S1020). In this case, if the display apparatus 200 is turned off, and the identification information of a music content is received, the display apparatus 200 may be turned on and the information related to a music content may be displayed.

The information related to a music content may be displayed in a UI screen where the information is arranged according to categories, and the layout of the UI screen may vary in terms of the size and location according to characteristics of the information. The searched related information may be categorized as detailed information regarding a music content, information on an application capable of servicing a music content, and VOD content information related to a music content based on the characteristics of the information.

If the identification information of a music content is received while an image is displayed on the display, a UI screen providing information related to a music content may be displayed on one area of the display screen.

Figure 11:
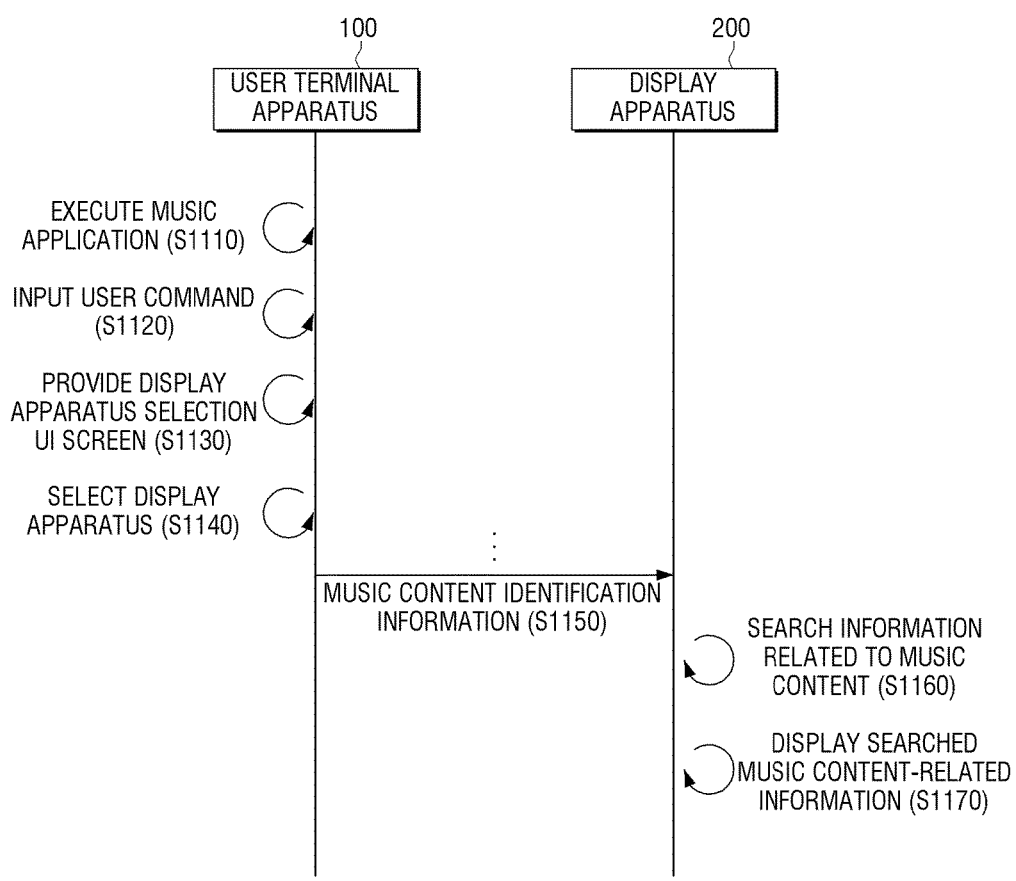
FIG. 11 is a timing diagram provided to explain a controlling method of a connected system including a user terminal apparatus and a display apparatus according to an exemplary embodiment.

FIG. 11 is a timing diagram provided to explain a controlling method of a connected system including a user terminal apparatus and a display apparatus according to an exemplary embodiment.

When a music application is executed in the user terminal apparatus 100 (S1110), an execution screen which may provide a music content is displayed. A user command may be input to the user terminal apparatus 100 (S1120). A user may be provided with a UI screen including information regarding an external display apparatus which is connected to the user terminal apparatus on a network in response to the user command (S1130). The user command may be realized as, for example, the operation of selecting a predetermined GUI displayed on one area of the execution screen.

If the user selects a display apparatus 200 (S1140), the identification information of a music content which is provided on the music application execution screen may be transmitted to the selected display apparatus 200 (S1150). The identification information may be one of identification information of a music content which is being played on the music application execution screen and identification information of a music content which is searched for on the music application execution screen.

When receiving the identification information, the display apparatus 200 performs a search based on the received identification information (S1160). When information related to a music content is found, the display apparatus 200 displays the information (S1170). The display apparatus 200 may display a UI screen where the searched information related to the music content is categorized.

Figure 12:
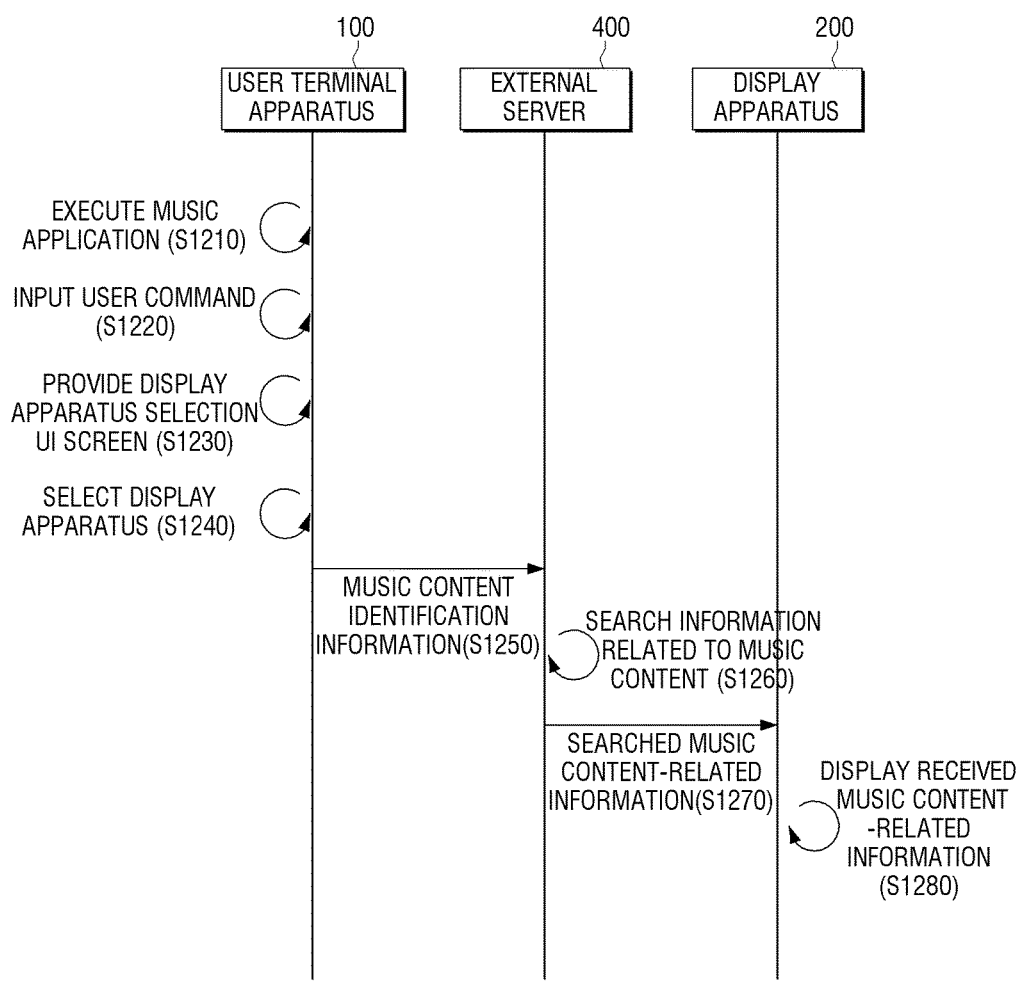
FIG. 12 is a timing diagram provided to explain a controlling method of a connected system including a user terminal apparatus and a display apparatus according to another exemplary embodiment.

FIG. 12 is a timing diagram provided to explain a controlling method of a connected system including a user terminal apparatus and a display apparatus according to another exemplary embodiment.

While a music application is executed (S1210), if a user command is input (S1220), a UI screen for selecting a connected display apparatus is provided (S1230). If a user selects a display apparatus 200 (S1240), the user terminal apparatus 100 may transmit identification information of a music content which is provided on the music application execution screen to an external server 200 (S1250).

The external server 400 may search for information related to the music content based on the received identification information of the music content (S1260), and transmit the search result to the display apparatus 200 (S1270). The display apparatus 200 displays information related to the music content based on the received search result (S1280).

Figure 13:
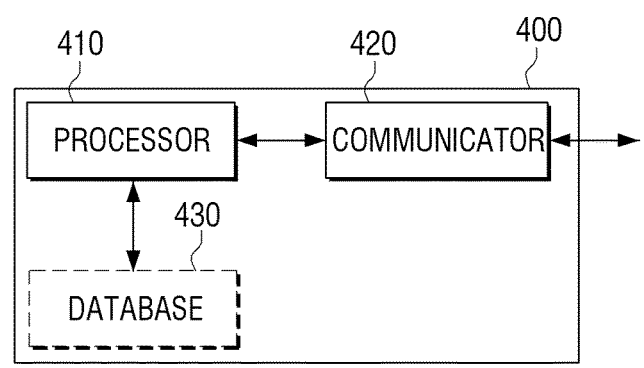
FIG. 13 is a block diagram of a server according to an exemplary embodiment.

FIG. 13 is a block diagram of a server according to an exemplary embodiment.

As illustrated in FIG. 13, the server 400 may include a processor 410, a communicator 420, i.e. a transceiver, and a database 430. However, the server 400 may include additional or alternative elements than those illustrated in FIG. 13, or not include all the elements illustrated in FIG. 13.

The processor 410 is configured to control an overall operation of the server 400, and may include, for example, a central processing unit (CPU).

The processor 410 may receive the music content identification information from the user terminal apparatus 100 through the communicator 420.

The processor 410 may search for the information related to the music content by using the music content identification information. The processor 410 may search for the information related to the music content by using a search engine included in the server 400, or use an external search server. The processor 410 may search for the information related to the music content in the database 430.

The communicator 420 is configured to transmit data to and receive data from the user terminal apparatus 100, the display apparatus 200, and the like through a wired or wireless network.

The communicator 420 may receive the music content identification information from the user terminal apparatus 100. Also, the communicator 420 may transmit the information related to the music content searched for by the processor 410 to the display apparatus 200.

The database 430 may store information related to music content.

The database 430 may include at least one storage medium, for example a memory of a flash memory type, hard disk type, multimedia card micro type, a card-type memory (e.g., SD or XD memory), random access memory (RAM), static random access memory (SRAM), read only memory (ROM), electrically erasable programmable read-only memory (EEPROM), programmable read-only memory (PROM), a magnetic memory, magnetic disk, optical disk, etc.

As described above, according to various exemplary embodiments, various information related to a music content which is selected by a user in a user terminal apparatus may be provided through the large screen of a display apparatus and, thus, user convenience can be enhanced.

As described above, according to various exemplary embodiments, there may be provided a controller including a processor and a storage. The storage may store a program. When executing the program, the processor may be configured to execute a music application, control a display of a user terminal to display information corresponding to an external display apparatus connected to the user terminal, and control, in response to receiving a user selection of the external display apparatus, the transmission of identification information corresponding to a music content provided by the music application to the external display apparatus.

As described above, according to various exemplary embodiments, there may be provided a controller including a processor and a storage. The storage may store a program. When executing the program, the processor may be configured to search, in response to identification information corresponding to a music content being received, for information related to the music content based on the received identification information, and control a display apparatus to display the searched for information related to the music content.

The controlling method of a user terminal apparatus and a display apparatus according to various exemplary embodiments may be realized as a program and stored in various recording media. In other words, a computer program which is processed by various processors and can execute the above-described various controlling methods may be stored and used in a recording medium.

For example, a non-transitory computer readable medium which stores a program including the steps of providing a music application execution screen according to a predetermined event, providing a UI screen including information regarding an external display apparatus connected with a user terminal apparatus according to a user command input on the execution screen, and transmitting identification information of a music content provided on the music application execution screen to the external display apparatus which is selected on the UI screen, or a program including the steps of receiving identification information of a music content provided through the execution screen from the user terminal apparatus which provides the music application execution screen and displaying information related to a music content which is searched for based on the received identification information may be provided.

The non-transitory recordable medium refers to a medium which may store data semi-permanently rather than storing data for a short time, such as register, cache, memory, etc., and is readable by an apparatus. Specifically, the above-described various applications and programs may be stored and provided in a non-transitory recordable medium such as, as non-limiting examples, a compact disc (CD), a DVD, a hard disk, a Blu-ray disk, a universal serial bus (USB) stick, a memory card, ROM, etc.

The foregoing exemplary embodiments and advantages are merely exemplary and are not to be construed as limiting the present invention. The present teaching can be readily applied to other types of apparatuses and methods. Also, the description of the one or more exemplary embodiments is intended to be illustrative, and not to limit the scope of the claims, and many alternatives, modifications, equivalents, and variations which will be apparent to those skilled in the art.

What is claimed is:

1. A user terminal apparatus comprising:
a speaker;
a display;
a user interface;
a communicator; and
a processor configured to:
control the display to provide, in response to a user command being input through the user interface, a user interface (UI) screen comprising information regarding an external display apparatus, the external display apparatus being connected to the user terminal apparatus through a network, control, in response to the external display apparatus being selected on the UI screen while sound corresponding to music content is provided through the speaker, the communicator to transmit identification information of the music content to the external display apparatus for use by the external display apparatus to search for information related to the music content, and control the speaker to continuously provide the sound corresponding to the music content after the identification information is transmitted to the external display apparatus.

2. The apparatus as claimed in claim 1, wherein the processor is further configured to, in response to the external display apparatus being selected on the UI screen while a music content is searched for on a music application execution screen displayed on the display, control the communicator to transmit identification information of the searched for music content to the selected external display apparatus.

3. The apparatus as claimed in claim 1, wherein
the processor is further configured to, in response to a predetermined graphical user interface (GUI) provided on one area of a music application execution screen displayed on the display being selected, provide the UI screen, and
the predetermined GUI comprises an icon representing the external display apparatus.

4. The apparatus as claimed in claim 1, wherein the music content comprises at least one of a music content pre-stored in the user terminal apparatus, a music content shared by a Digital Living Network Alliance (DLNA), a music content provided through streaming, and a music content provided through a radio channel.

5. A controlling method of a user terminal apparatus comprising:
providing, in response to a user command being input, a user interface (UI) screen comprising information regarding an external display apparatus, the external display apparatus being connected to the user terminal apparatus through a network;
transmitting, in response to the external display apparatus being selected on the UI screen while sound corresponding to music content is provided through a speaker of the user terminal apparatus, identification information of the music content to the external display apparatus for use by the external display apparatus to search for information related to the music content; and
providing, through the speaker, the sound corresponding to the music content continuously after the identification information is transmitted to the external display apparatus.

6. The method as claimed in claim 5, wherein the transmitting identification information comprises transmitting, in response to the external display apparatus being selected on the UI screen while a music content is searched for on a music application execution screen, identification information of the searched for music content to the selected external display apparatus.

7. The method as claimed in claim 5, wherein
the providing the UI screen comprises providing, in response to a predetermined graphical user interface (GUI) provided on one area of a music application execution screen being selected, the UI screen, and
the predetermined GUI comprises an icon representing the external display apparatus.

8. The method as claimed in claim 5, wherein the music content comprises at least one of a music content pre-stored in the user terminal apparatus, a music content shared by a Digital Living Network Alliance (DLNA), a music content provided through streaming, and a music content provided through a radio channel.

9. A display apparatus comprising:
a display;
a communicator; and
a processor configured to:
in response to receiving, from a user terminal apparatus via the communicator, identification information of a music content corresponding to sound being provided through a speaker of the user terminal apparatus, search for information related to the music content using the received identification information and control the display to provide the information related to the music content which results from searching, so that the information related to the music content is provided through the display while the sound corresponding to the music content is provided through the speaker of the user terminal apparatus.

10. The apparatus as claimed in claim 9, wherein the processor is further configured to, in response to the identification information being received while the display apparatus is turned off, control the display apparatus to turn on and control the display to provide the information related to the music content.

11. The apparatus as claimed in claim 9, wherein the processor is further configured to, in response to the identification information being received while an image is displayed on the display, control the display to provide a user interface (UI) screen that provides the information related to the music content on a portion of a display screen of the display.

12. The apparatus as claimed in claim 9, wherein the information related to the music content comprises at least one of detailed information on the music content, information on an application capable of servicing the music content, and information on Video On Demand (VOD) content related to the music content.

13. The apparatus as claimed in claim 9, wherein the processor is further configured to, in response to a music source of the music content being received from the user terminal apparatus, control the received music source to be output through an external speaker.

14. A controlling method of a display apparatus comprising:
receiving, from a user terminal apparatus, identification information of a music content corresponding to sound being provided through a speaker of the user terminal apparatus;
searching for information related to the music content using the received identification information; and
providing the information related to the music content which results from searching, so that the information related to the music content is provided through the display apparatus while the sound corresponding to the music content is provided through the speaker of the user terminal apparatus.

15. The method as claimed in claim 14, wherein the providing comprises, in response to the identification information being received while the display apparatus is turned off, turning on the display apparatus and providing the information related to the music content.

16. The method as claimed in claim 14, wherein the providing comprises, in response to the identification information being received while an image is displayed, providing a user interface (UI) screen that provides the information related to the music content on a portion of a display screen of the display apparatus.

17. The method as claimed in claim 14, wherein the information related to the music content comprises at least one of detailed information on the music content, information on an application capable of servicing the music content, and information on Video On Demand (VOD) content related to the music content.

18. A connected system comprising:
 a display apparatus; and
 an electronic apparatus configured to:
  provide sound corresponding to music content, and transmit identification information of the music content to the display apparatus in response to receiving a user command while the sound corresponding to the music content is provided, wherein the display apparatus is configured to, in response to receiving the identification information of the music content from the electronic apparatus, search for information related to the music content based on the received identification information and provide the information related to the music content which results from searching, so that the information related to the music content is provided through the display apparatus while the sound corresponding to the music content is provided through the electronic apparatus.

19. The apparatus as claimed in claim 9, wherein the information related to the music content comprises at least one of information regarding a singer of the music content, information regarding a song corresponding to the music content, information regarding a songwriter of the music content, information regarding a lyricist of the music content, and information regarding an album including the music content.

\* \* \* \* \*